(12) United States Patent
Kim et al.

(10) Patent No.: US 10,632,867 B2
(45) Date of Patent: Apr. 28, 2020

(54) VEHICLE AND A METHOD OF CONTROLLING SAME

(71) Applicants: HYUNDAI MOTOR COMPANY, Seoul (KR); KIA MOTORS CORPORATION, Seoul (KR)

(72) Inventors: Hyung Joo Kim, Busan (KR); Young Keun Cho, Suwon-si (KR); In Ju Lee, Seoul (KR); Dong Soo Shin, Suwon-si (KR); Yo Han Hahm, Hwaseong-si (KR); Sung Rae Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 249 days.

(21) Appl. No.: 15/722,586

(22) Filed: Oct. 2, 2017

(65) Prior Publication Data
US 2018/0194247 A1    Jul. 12, 2018

(30) Foreign Application Priority Data

Jan. 9, 2017   (KR) .................. 10-2017-0003014

(51) Int. Cl.
| | |
|---|---|
| *B60N 2/02* | (2006.01) |
| *B60N 2/14* | (2006.01) |
| *B60K 35/00* | (2006.01) |
| *G05D 1/00* | (2006.01) |

(52) U.S. Cl.
CPC ............ *B60N 2/0244* (2013.01); *B60K 35/00* (2013.01); *B60N 2/14* (2013.01); *B60K 2370/15* (2019.05); *B60K 2370/152* (2019.05); *B60K 2370/167* (2019.05); *B60K 2370/175* (2019.05); *B60K 2370/194* (2019.05); *B60K 2370/67* (2019.05);
(Continued)

(58) Field of Classification Search
None
See application file for complete search history.

(56) References Cited

U.S. PATENT DOCUMENTS

| | | | |
|---|---|---|---|
| 8,775,031 B1 * | 7/2014 | Bankhead | ............... B60R 1/025 359/843 |
| 9,669,871 B2 | 6/2017 | Kuoch | |
| 9,836,966 B2 * | 12/2017 | Peterson | .............. G08G 1/0962 |

(Continued)

FOREIGN PATENT DOCUMENTS

| | | |
|---|---|---|
| JP | 2016097968 A | 5/2016 |
| JP | 2016527140 A | 9/2016 |

(Continued)

*Primary Examiner* — Jonathan M Dager
*Assistant Examiner* — Garrett F Evans
(74) *Attorney, Agent, or Firm* — Lempia Summerfield Katz LLC

(57) ABSTRACT

A vehicle and a method of controlling the vehicle include a display unit, an adjuster configured to move the display unit within a preset angle range, and a controller configured to move the display unit to correspond to a change in a proceeding direction of the vehicle during autonomous driving of the vehicle to a preset destination. When an autonomous vehicle changes a vehicle proceeding direction during driving, a display unit or a seat inside the vehicle is turned and moved in the same direction as the changed vehicle proceeding direction to lower a physical angular speed that affects human carsickness, thereby reducing carsickness.

17 Claims, 6 Drawing Sheets

(52) U.S. Cl.
CPC .... *B60K 2370/70* (2019.05); *B60N 2002/022* (2013.01); *G05D 1/0088* (2013.01)

(56) References Cited

U.S. PATENT DOCUMENTS

| | | | | |
|---|---|---|---|---|
| 2009/0164073 A1* | 6/2009 | Mabuchi | ............ | B60N 2/0232 |
| | | | | 701/49 |
| 2016/0052514 A1 | 2/2016 | Clarke | | |
| 2016/0185387 A1 | 6/2016 | Kuoch | | |
| 2019/0054920 A1* | 2/2019 | Karlsson | ................ | H04W 4/46 |

FOREIGN PATENT DOCUMENTS

| | | |
|---|---|---|
| KR | 101490905 B1 | 2/2015 |
| WO | WO2016120363 A2 | 8/2016 |

\* cited by examiner

BEFORE VEHICLE TURNS
(-α<t<0)

EARLY VEHICLE TURNS
(0<t< β/2)
CONTINUOUSLY TURN
MONITOR/DISPLAY

INTERMEDIATE TURNING TIME POINT
(t= β/2)
MONITOR/DISPLAY CORRESPONDS
TO VEHICLE DIRECTION

LATTERLY VEHICLE TURNS
(β/2<t<β+ℓ)

AFTER VEHICLE TURNS
(t> β+ɤ)

BEFORE VEHICLE TURNS
(−α<t<0)

EARLY VEHICLE TURNS
(0<t< β/2)

INTERMEDIATE TURNING TIME POINT
(t= β/2)

LATTERLY VEHICLE TURNS
($\beta/2 < t < \beta + \gamma$)

AFTER VEHICLE TURNS
($t > \beta + \gamma$)

VEHICLE AND A METHOD OF CONTROLLING SAME

This application claims priority to and the benefit of Korean Patent Application No. 10-2017-0003014, filed on Jan. 9, 2017, which is hereby incorporated by reference as if fully set forth herein.

BACKGROUND

Field of the Disclosure

The present disclosure relates to a vehicle, and more particularly, to a vehicle and a method of controlling the vehicle for preventing carsickness of at least one of the passengers of the vehicle while driving.

Discussion of the Related Art

Carsickness is frequently caused when an acceleration generated in the event of an excessive direction change during vehicle driving and the change is detected through the vestibular organ or system of a passenger.

Carsickness is mainly caused when a difference between a sense of rotation felt by the human vestibular organ or system and visual information input to the eye is excessive.

In the case of a typical vehicle, a driver knows a proceeding or driving direction of a vehicle and controls the direction. Thus, he or she is not sensitive to carsickness. However, passengers who are not driving a vehicle or are in an autonomous vehicle may not detect visual information on direction change due to reading or other actions. Thus, serious carsickness may result.

In particular, in the case of an autonomous vehicle, there is a problem in that the possibility of carsickness due to direction change is high because all of the passengers do not drive the vehicle.

SUMMARY

Accordingly, the present disclosure is directed to a vehicle and a method of controlling the vehicle that substantially obviates one or more problems due to limitations and disadvantages of the related art.

An object of the present disclosure is to provide a vehicle and a method of controlling the vehicle, for turning and moving a display unit inside the vehicle in the same direction as a change in a vehicle proceeding direction when the proceeding direction of the vehicle is changed in an autonomous vehicle.

Another object of the present disclosure is to provide a vehicle and a method of controlling the vehicle, for rotating at least one seat inside the vehicle in the same direction as a change in a vehicle proceeding direction when the proceeding direction of the vehicle is changed in an autonomous vehicle.

Additional advantages, objects, and features of the disclosure are set forth in part in the following description and in part will become apparent to those having ordinary skill in the art upon examination of the following description or may be learned from practice of the disclosed invention. The objectives and other advantages of the disclosure may be realized and attained by the structure particularly pointed out in the written description and claims hereof, as well as the appended drawings.

To achieve these objects and other advantages and in accordance with the purpose of the disclosure, as embodied and broadly described herein, a vehicle includes a display unit and an adjuster configured to move the display unit within a preset angle range. The vehicle also includes a controller configured to control the adjuster to move the display unit to correspond to a change in a proceeding direction of the vehicle during autonomous driving of the vehicle to a preset destination.

In another aspect of the present disclosure, a method of controlling a vehicle that has a display unit includes autonomously driving the vehicle to a preset destination. The method also includes turning and moving the display unit in a left curved direction or a right curved direction within a preset angle range to correspond to a change in a proceeding direction of the vehicle.

In another aspect of the present disclosure, a vehicle includes an adjuster configured to turn and move at least one seat inside the vehicle in a left curved direction or a right curved direction within a preset angle range. The vehicle also includes a controller configured to control the adjuster to turn and move the at least one seat in a left curved direction or a right curved direction at an angle corresponding to a proceeding direction of the vehicle during autonomous driving of the vehicle to a preset destination.

In another aspect of the present disclosure, a method of controlling a vehicle that has at least one seat includes autonomously driving the vehicle to a preset destination. The method also includes turning and moving the at least one seat in a left curved direction or a right curved direction at an angle corresponding to a change in a proceeding direction of the vehicle.

It is to be understood that both the foregoing general description and the following detailed description of the present disclosure are provided as examples, are explanatory, and are thus intended to provide further explanation of the invention as claimed.

BRIEF DESCRIPTION OF THE DRAWINGS

The accompanying drawings are included to provide a further understanding of the disclosure and are incorporated in and constitute a part of this application. The drawings illustrate embodiment(s) of the disclosure and together with the description serve to explain the principle of the disclosure. In the drawings.

DETAILED DESCRIPTION OF THE EMBODIMENTS

Figure 1:
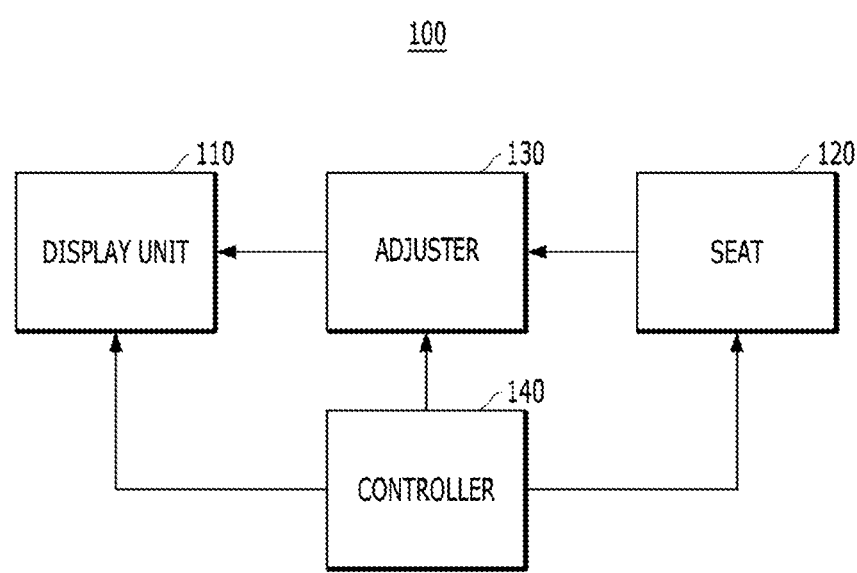
FIG. 1 is a block diagram illustrating an example of an autonomous vehicle according to an embodiment of the present disclosure.

Embodiments of the present disclosure are described in detail so that those of ordinary skill in the art may easily implement the disclosure with reference to the accompanying drawings. However, the present disclosure may be implemented in various different forms and is not limited to these embodiments. To clearly describe the present disclosure, parts unrelated to the description are omitted in the drawings. Further, like reference numerals in the specification and drawings denote like elements.

Throughout the specification, one of ordinary skill in the art would understand that terms such as "include", "comprise", and "have" are to be interpreted by default as inclusive or open rather than exclusive or closed unless expressly defined to the contrary. Further, terms such as "unit", "module", and the like disclosed in the specification are intended to mean units for processing at least one function or operation, which may be implemented by hardware, software, or a combination thereof.

Throughout the specification, when a certain part "includes" a certain component, this indicates that the part may further include another component instead of excluding another component unless there is no different disclosure. The same reference numbers are used throughout the drawings to refer to the same parts.

Hereinafter, a procedure to reduce the likelihood of carsickness among passengers in an autonomous vehicle applied to embodiments of the present disclosure are described in detail with reference to FIGS. 1-7.

FIG. 1 is a block diagram illustrating an example of an autonomous vehicle according to an embodiment of the present disclosure.

FIGS. 2-7 are diagrams for explaining a procedure of reducing carsickness among passengers in an autonomous vehicle according to an embodiment of the present disclosure.

Referring to FIGS. 1-7, an autonomous vehicle 100 according to an embodiment of the present disclosure may include a display unit 110, at least one seat 120 inside the vehicle 100, and an adjuster 130 for changing a position or angle of the display unit 110 and/or the seat 120 within a preset angle range. The autonomous vehicle 100 may also include a controller 140 for controlling the adjuster 130 to make the display unit 110 and/or the seat 120 move according to changes in a proceeding or driving direction of the vehicle 100 during autonomous driving of the vehicle 100 toward a preset destination.

The display unit 110 may display various sensing information items of the vehicle 100, navigation information, media information, and the like. The display unit 110 may be installed in at least one of a front surface and a ceiling of the vehicle 100. The display unit 100 may also be installed at positions that allow passengers to view the display unit 110 from a back seat. The display unit 110 may be configured in the form of a display that is to be turned and moved in a left curved direction or a right curved direction within a preset angle range.

According to an embodiment, the adjuster 130 may include a motor for changing the position or angle of the seat 120 or the display unit 110. The motor can rotate the seat 120 or the display unit 110 about a rotational axis located in the center of gravity of the seat or display unit. The adjuster 130 may include a crank or cam or at least one gear that transmits the power of the motor to rotate the seat 120 or the display unit 110 by a preset angle range.

The adjuster 130 may include a first adjuster for changing the position or angle of the seat 120 and a second adjuster for changing the position or angle of the display unit 110.

The vehicle and method of the present disclosure may reduce carsickness of a driver and passengers in the vehicle 100 by moving the display unit 110 and/or the seat 120 according to changes in a proceeding or driving direction of the vehicle 100 including during autonomous driving of the vehicle 100 toward a preset destination.

Hereinafter, with reference to FIGS. 2-4, a procedure is described for reducing carsickness by moving the display unit 110 according to changes in a proceeding direction of the vehicle 100 during autonomous driving of the vehicle 100 toward a preset destination.

Figure 3A:
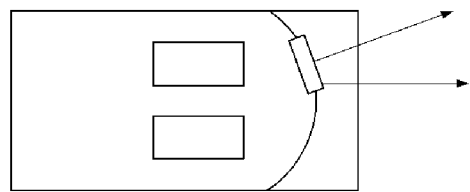
Figure 3B:
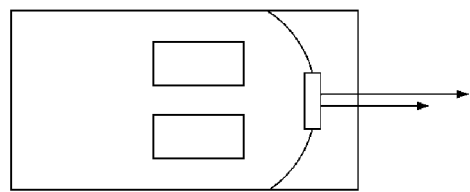
Figure 4:
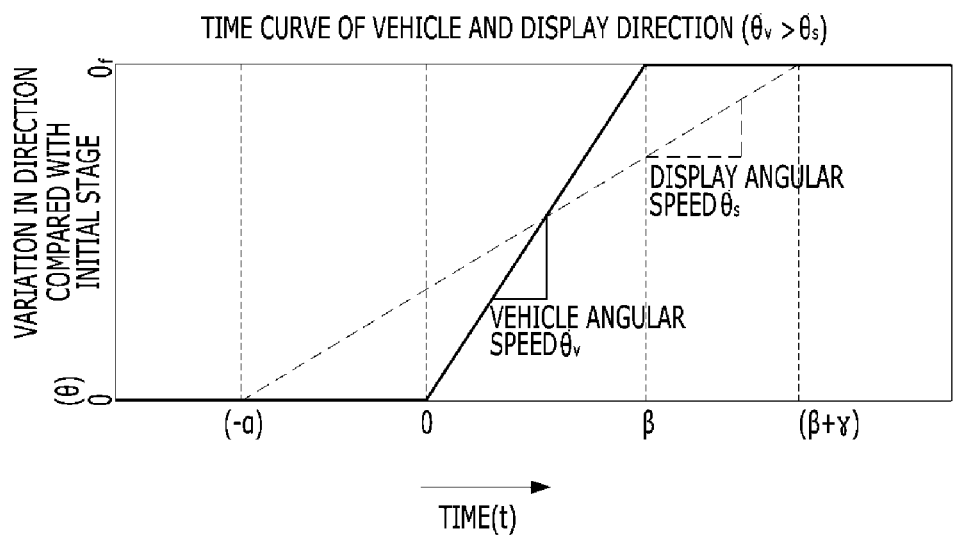

In other words, referring to FIGS. 2-4, the controller 140 may control the adjuster 130 to predict a time point at which a proceeding direction of the currently driven vehicle 100 is to be changed. The controller 140 may use driving path information to a preset destination or manipulation of a steering wheel. The controller 140 may control the adjuster to turn and move the display unit 110 in the same curved direction as the proceeding direction to be changed. The movement of the display unit may be selected from a left curved direction and a right curved direction, within a preset angle range immediately before the predicted time point.

In this embodiment, the controller 140 may perform control to move the display unit 110 in the predicted proceeding direction. The controller 140 may perform control to turn and move the display unit 110 in a left curved direction or a right curved direction in proportion to variation of the predicted proceeding direction of the vehicle 100.

Upon detecting a change in the proceeding direction of the vehicle according to steering manipulation of the vehicle 100, the controller 140 may perform control to move the display unit 110 in the same curved direction as the changed proceeding direction. The controller 140 may control the adjuster 130 to move the display unit 110 at a lower speed than a speed at which the proceeding direction is changed.

When the change in the proceeding direction of the vehicle 100 is completed, the controller 140 may perform control to move the display unit 110 back to an original position. The controller 140 may control the adjuster 130 to move the display unit 110 back to the original position at a lower speed than a speed at which the display unit 110 is moved according to a change in the proceeding direction of the vehicle 100.

Figure 2A:
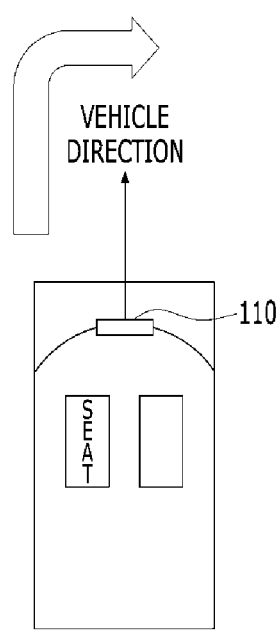
FIGS. 2A-7 are diagrams for explaining a procedure of reducing carsickness in an autonomous vehicle according to an embodiment of the present disclosure.
Figure 2B:
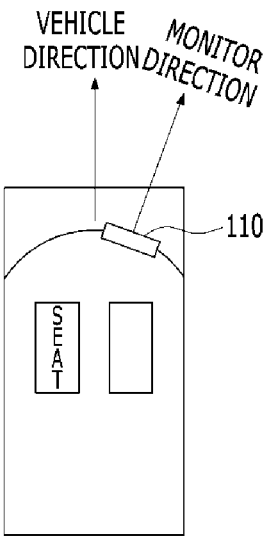

For example, as illustrated in FIG. 2A, when the vehicle 100 is predicted to turn right, the controller 140 may, through the adjuster 130, precedingly turn the display unit 110 within a preset angle range. The display unit 110 may be moved immediately before (−α) a time point at which the vehicle is predicted to turn right before the vehicle turns right, as illustrated in FIG. 2B.

Figure 2C:
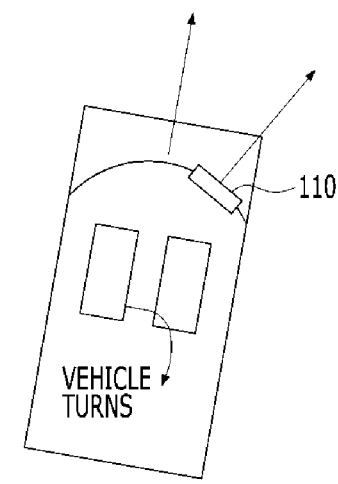

As illustrated in FIG. 2C, when the vehicle begins to turn to the right, the controller 140 may control the adjuster 130 to move the display unit 110 in a curved direction at a higher speed than a speed at which the vehicle turns. The display unit 110 may be moved to the right before an intermediate time point 't' (0<t<β/2, where β is a time point at which the vehicle completes the right turn) of a time point at which the vehicle completes the right turn.

Figure 2D:
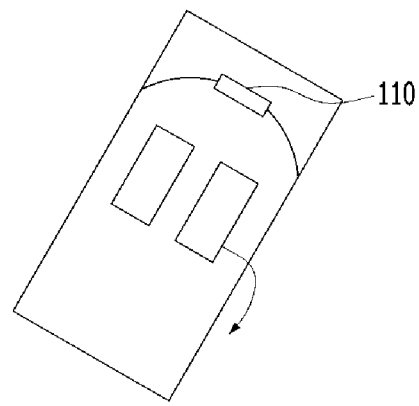

Then, as illustrated in FIG. 2D, when the vehicle turns to the right by an intermediate degree (t=β/2), the controller 140 may control the adjuster 130 such that the proceeding direction of the vehicle is the same as a moving direction of the display unit 110.

Then, as illustrated in FIG. 3A, when the vehicle turns right by a greater degree than the intermediate degree, the controller 140 may control the adjuster 130 to move the display unit 110 in a curved direction at a lower speed than a speed at which the vehicle turns right.

As illustrated in FIG. 3B, when the vehicle completes the right turn, the controller 140 may control the adjuster 130 such that the proceeding direction of the vehicle is then the same as the moving direction of the display unit 110.

In other words, the controller 140 may control the adjuster 130 to turn and move the display unit 110 at a higher speed than the speed at which a proceeding direction of the vehicle is changed until the display unit 110 begins to turn and move in a left or right curved direction along the proceeding direction of the vehicle within an entire angle range in which the display unit 110 is rotatable in a left or right curved direction and, then, reaches an intermediate angle of the entire angle range. When the display unit 110 is turned and moved at an angle greater than the intermediate angle of the entire angle range, the controller 140 may control the adjuster 130 to turn and move the display unit 110 at a lower speed than the speed at which the proceeding direction of the vehicle is changed.

Figure 5A:
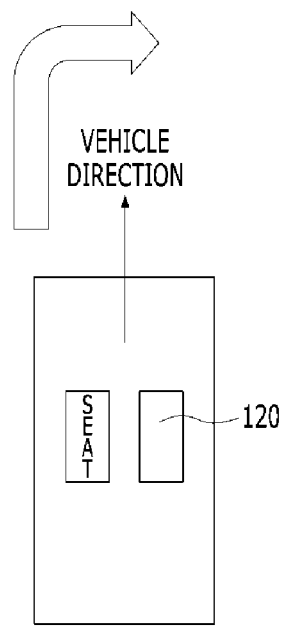
Figure 5B:
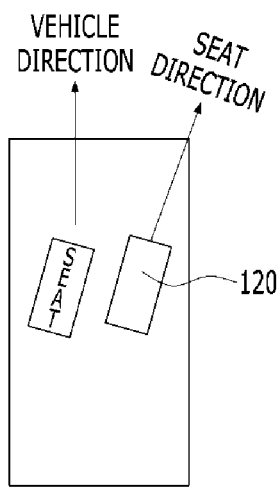
Figure 5C:
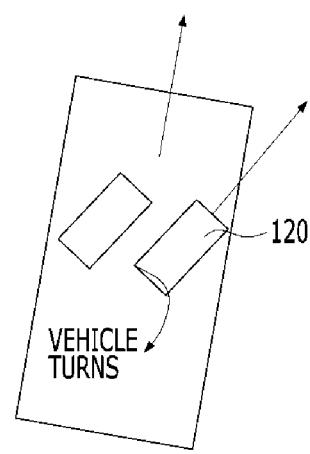
Figure 5D:
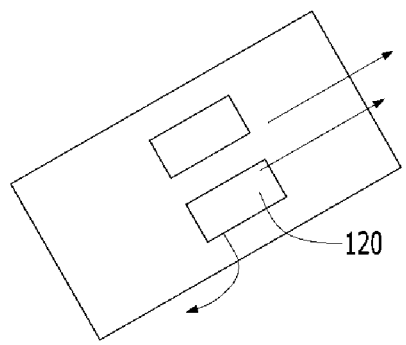
Figure 6A:
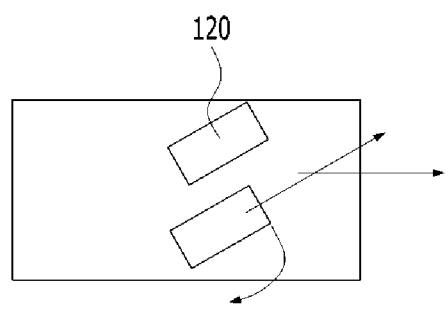
Figure 6B:
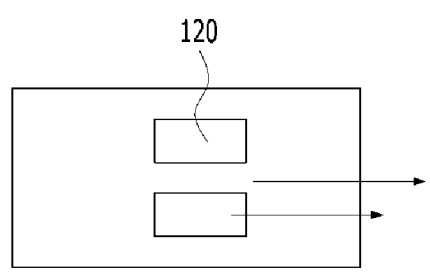
Figure 7:
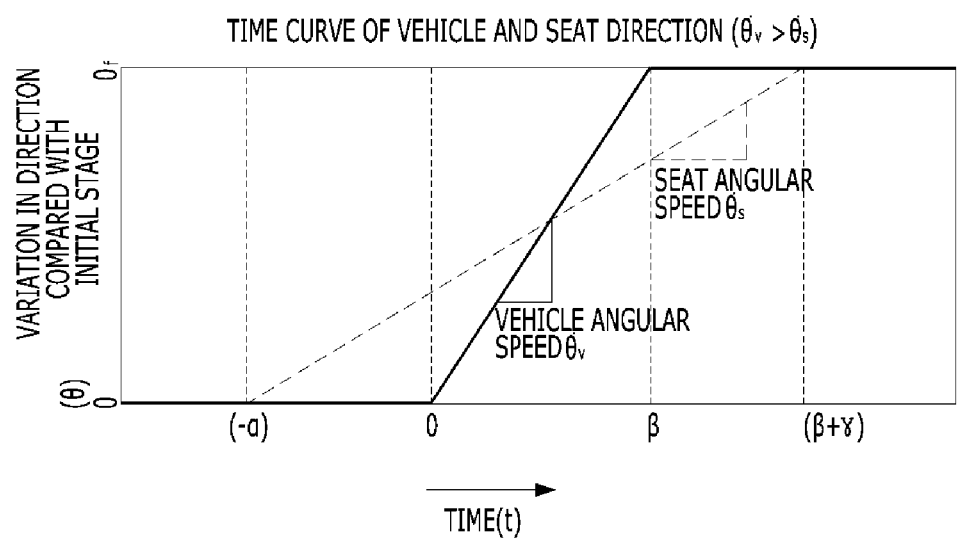

Referring to FIGS. 5-7, which are described below, the controller 140 may be synchronized with the display unit 110 and may turn and move at least one seat 120 inside the vehicle within the preset angle range in a left curved direction or a right curved direction, in the same turning direction and at the same turning speed as the display unit 110.

FIG. 4 is a diagram illustrating a time curve of directions of a vehicle and a display unit.

The angle $\theta_v$ refers to a direction change angle of a vehicle compared with an initial stage or driving direction. The angle $\theta_s$ refers to a direction angle of a display unit compared with an initial stage or reference angle. The angle $\theta_f$ refers to a last direction angle of the vehicle and the display unit after a direction change is performed. The time t=0 refers to a time point at which the vehicle begins to change a direction of driving. The time t=$\beta$ refers to a time point at which a direction change of the vehicle is terminated or completed. The time t=(−$\alpha$) refers to a time point at which the method of the present disclosure is initiated and before the direction of the vehicle is changed ($\alpha$>0). The time t=($\beta$+$\gamma$) refers to a time point at which the method of the present disclosure is terminated with an interval of $\gamma$ after the direction change of the vehicle is completed. The angular velocity $\dot{\theta}_v=\theta_f/\beta$ refers to the average angular velocity after and before the direction of the vehicle is changed. The angular velocity $\dot{\theta}_s=\theta_f/(\alpha+\beta+\gamma)$ refers to an average angular velocity of the display unit after and before the direction of the vehicle is changed.

Hereinafter, with reference to FIGS. 5-7, a procedure for reducing carsickness among passengers in the vehicle 100 is described. The procedure includes moving the seat 120 according to a change in the proceeding direction of the vehicle 100 during autonomous driving of the vehicle 100 to a preset destination.

Referring to FIGS. 5-7, the controller 140 may, through the adjuster, rotate at least one seat 120 inside the vehicle in a left direction or a right direction at an angle within a preset angle range and corresponding to a change in the proceeding direction of the vehicle 100.

In this case, the controller 140 may predict a time point at which the proceeding direction of the vehicle is to be changed. The controller 140 may predict the time point using driving path information to a preset destination. The controller 140 may control the adjuster 130 to rotate the seat 120 immediately before the predicted time point.

In other words, the controller 140 may perform control to rotate the seat 120 in the predicted proceeding direction of the vehicle. The controller may control the adjuster 130 to rotate the seat 120 in a left direction and a right direction in proportion to a variation of the predicted proceeding direction of the vehicle.

Upon detecting a change in the proceeding direction of the vehicle according to steering manipulation of the vehicle 100, the controller 140 may perform control to move the seat 120 in the same direction as the changed proceeding direction. The controller 140 may control the adjuster 130 to move the seat 120 at a lower speed than a speed at which the proceeding direction is changed.

When the change in the proceeding direction of the vehicle 100 is completed, the controller 140 may perform control to move the seat 120 back to an original angle before the seat 120 is rotated. The controller may control the adjuster 130 to move the seat 120 back to the original angle at a lower speed than a speed at which the seat 120 is moved according to the change in the proceeding direction of the vehicle 100.

For example, as illustrated in FIG. 5A, when the vehicle is predicted to turn right, the controller 140 may, through the adjuster 130, precedingly turn the seat 120 within a preset angle range. The seat 120 may be turned immediately before (−$\alpha$) a time point at which the vehicle is predicted to turn right before the vehicle turns right, as illustrated in FIG. 5B.

As illustrated in FIG. 5C, when the vehicle begins to turn right, the controller 140 may control the adjuster 130 to move the seat 120 at a higher speed than the speed at which the vehicle turns right. The seat 120 may be moved before an intermediate time point (0<t<$\beta$/2, where $\beta$ is a time point at which the vehicle completes the right turn) of a time point at which the vehicle completes the right turn.

Then, as illustrated in FIG. 5D, when the vehicle turns right by an intermediate degree (t=$\beta$/2), the controller 140 may control the adjuster 130 such that the proceeding direction of the vehicle is the same as a moving direction of the seat 120.

Then, as illustrated in FIG. 6A, when the vehicle turns right by a greater degree than the intermediate degree, the controller 140 may control the adjuster 130 to move the seat 120 at a lower speed than the speed at which the vehicle turns right.

As illustrated in FIG. 6D, when the vehicle completes the right turn, the controller 140 may control the adjuster 130 such that the proceeding direction of the vehicle is the same as the moving direction of the seat 120.

In other words, the controller 140 may control the adjuster 130 to turn the seat 120 at a higher speed than the speed at which a proceeding direction of the vehicle is changed until the seat 120 begins to turn in a left or right curved direction along the proceeding direction of the vehicle within an entire angle range within which the seat 120 is turned in a left or right curved direction and, then, reaches an intermediate angle of the entire angle range. When the seat 120 is moved at an angle greater than the intermediate angle of the entire angle range, the controller 140 may control the adjuster 130 to turn the seat 120 at a lower speed than the speed at which the proceeding direction of the vehicle is changed.

The controller 140 may be synchronized with the seat 120 and may turn and move the display unit 110 within the preset angle range in a left curved direction or a right curved direction, in the same turning direction and at the same turning speed as the seat 120.

FIG. 7 is a diagram illustrating a time curve of a vehicle and a seat.

The angle $\theta_v$ refers to a direction change angle of a vehicle compared with an initial stage or driving direction. The angle $\theta_s$ refers to a direction angle of a seat compared with an initial stage or angle. The angle $\theta_f$ refers to a last direction angle of the vehicle and the seat after a direction change is performed. The time t=0 refers to a time point at which the vehicle begins to change a direction. The time t=$\beta$ refers to a time point at which the direction change of the vehicle is terminated or completed. The time t=(−$\alpha$) refers to a time point at which the method of the present disclosure is initiated and before the direction of the vehicle is changed ($\alpha$>0). The time t=($\beta$+$\gamma$) refers to a time point at which the method of the present disclosure is terminated with an interval of $\gamma$ after the direction change of the vehicle is completed. The angular velocity $\dot{\theta}_v=\theta_f/\beta$ refers to average angular velocity after and before the direction of the vehicle is changed. The angular velocity $\dot{\theta}_s=\theta_f/(\alpha+\beta+\gamma)$ refers to an average angular velocity of a seat after and before the direction of the vehicle is changed.

The aforementioned present disclosure can also be embodied as computer readable code stored on a computer readable recording medium. The computer readable recording medium is any data storage device that can store data, which can thereafter be read by a computer. Examples of the computer readable recording medium include a hard disk drive (HDD), a solid-state drive (SSD), a silicon disc drive (SDD), read-only memory (ROM), random-access memory (RAM), CD-ROM, magnetic tapes, floppy disks, optical data storage devices, carrier wave (e.g., transmission via the Internet), and the like.

The aforementioned vehicle and method of controlling the vehicle according to at least one embodiment of the present disclosure may provide an effect of reducing carsickness. The disclosed vehicle and method provide this effect by turning and moving a display unit inside the vehicle in the same direction as a changed proceeding direction of the vehicle to a lower physical angular speed than that which may cause human carsickness when the proceeding direction of the vehicle is changed during autonomous driving.

A vehicle and a method of controlling the vehicle according to at least one other embodiment of the present disclosure may provide an effect of reducing carsickness. The disclosed vehicle and method provide this effect by turning and moving at least one seat inside the vehicle in the same direction as a changed proceeding direction of the vehicle to a lower physical angular speed than that which may cause human carsickness when the proceeding direction of the vehicle is changed during autonomous driving.

It will be appreciated by persons having ordinary skill in the art that the effects that could be achieved with the present disclosure are not limited to what has been particularly described hereinabove. Other advantages of the present disclosure will be more clearly understood from the above detailed description.

It will be apparent to those having ordinary skill in the art that various modifications and variations can be made in the disclosed embodiments without departing from the spirit or scope of the disclosure. Thus, it is intended that the present disclosure cover the modifications and variations of this disclosure provided they come within the scope of the appended claims and their equivalents.

What is claimed is:

1. A vehicle comprising:
   a display unit;
   an adjuster configured to move the display unit within a preset angle range; and
   a controller configured to control the adjuster to move the display unit to correspond to a change in a proceeding direction of the vehicle during autonomous driving of the vehicle to a preset destination,
   wherein the controller predicts a time point at which the proceeding direction of the vehicle is to be changed using driving path information to the preset destination and performs control to turn and move the display unit before the predicted time point.

2. The vehicle according to claim 1, wherein the display unit can be turned and moved in a left curved direction or a right curved direction within the preset angle range.

3. The vehicle according to claim 1, wherein the controller performs control to turn and move the display unit in the predicted proceeding direction of the vehicle and performs control to turn and move the display unit in a left curved direction and a right curved direction in proportion to a variation of the predicted proceeding direction of the vehicle.

4. The vehicle according to claim 1, wherein, upon detecting the change in the proceeding direction of the vehicle according to steering manipulation of the vehicle, the controller performs control to turn and move the display unit in the same direction as the change in the proceeding direction and performs control to turn and move the display unit at a higher or a lower speed than a speed at which the proceeding direction is changed.

5. The vehicle according to claim 4, wherein the controller controls the adjuster to turn and move the display unit at a higher speed than the speed at which the proceeding direction is changed until the display unit begins to turn and move within the preset angle range by the adjuster and, then, reaches an intermediate angle of the preset angle range, and, when the display unit is turned and moved at an angle greater than the intermediate angle of the entire angle range, the controller controls the adjuster to turn and move the display unit at a lower speed than the speed at which the proceeding direction is changed.

6. A vehicle comprising:
   an adjuster configured to turn and move at least one seat inside the vehicle in a left curved direction or a right curved direction within a preset angle range; and
   a controller configured to control the adjuster to turn and move the at least one seat in a left curved direction or a right curved direction at an angle corresponding to a proceeding direction of the vehicle during autonomous driving of the vehicle to a preset destination,
   wherein the controller predicts a time point at which the proceeding direction of the vehicle is to be changed using driving path information to the preset destination and performs control to turn and move the at least one seat before the predicted time point.

7. The vehicle according to claim 6, wherein the controller performs control to turn and move the at least one seat in the predicted proceeding direction of the vehicle and performs control to turn and move the at least one seat in a left curved direction and a right curved direction in proportion to a variation of the predicted proceeding direction of the vehicle.

8. The vehicle according to claim 6, wherein, upon detecting the change in the proceeding direction of the vehicle according to steering manipulation of the vehicle, the controller performs control to turn and move the at least one seat in the same direction as the change in the proceeding direction and performs control to turn and move the at least one seat at a higher or a lower speed than a speed at which the proceeding direction is changed.

9. The vehicle according to claim 8, wherein the controller controls the adjuster to turn and move the at least one seat at a higher speed than the speed at which the proceeding direction is changed until the at least one seat begins to turn and move within the preset angle range by the adjuster and, then, reaches an intermediate angle of the preset angle range, and, when the at least one seat is turned and moved at an angle greater than the intermediate angle of the entire angle range, the controller controls the adjuster to turn and move the at least one seat at a lower speed than the speed at which the proceeding direction is changed.

10. The vehicle according to claim 6, further comprising a display unit configured to be turned and moved in a left curved direction or a right curved direction within the preset angle range by the adjuster, wherein the controller controls the adjuster to turn and move the display unit in the same turning direction and at the same turning speed as the at least one seat.

11. A method of controlling a vehicle comprising a display unit, the method comprising:
  autonomously driving the vehicle to a preset destination; and
  turning and moving the display unit in a left curved direction or a right curved direction to correspond to a change in a proceeding direction of the vehicle within a preset angle range,
  wherein, when predicting a time point at which the proceeding direction of the vehicle is to be changed using driving path information to the preset destination, the display unit is turned and moved before the predicted time point.

12. The method according to claim 11, wherein the turning and moving comprises, upon detecting the change in the proceeding direction of the vehicle according to steering manipulation of the vehicle, performing control to turn and move the display unit in the same direction as the change in the proceeding direction at a higher speed or a lower speed than a speed at which the proceeding direction is changed.

13. The method according to claim 12, wherein the turning and moving comprises:
  moving the display unit at higher speed than the speed at which the proceeding direction is changed until the display unit begins to turn and move within the preset angle range and, then, reaches an intermediate angle of the preset angle range; and
  when the display unit is turned and moved at an angle greater than the intermediate angle of the entire angle range, moving the display unit at a lower speed than the speed at which the proceeding direction is changed.

14. A method of controlling a vehicle comprising at least one seat, the method comprising:
  autonomously driving the vehicle to a preset destination; and
  turning and moving the at least one seat in a left curved direction or a right curved direction at an angle corresponding to a change in a proceeding direction of the vehicle,
  wherein, when predicting a time point at which the proceeding direction of the vehicle is to be changed using driving path information to the preset destination, the at least one seat is turned and moved before the predicted time point.

15. The method according to claim 14, wherein the turning and moving comprises, upon detecting the change in the proceeding direction of the vehicle according to steering manipulation of the vehicle, turning and moving the at least one seat in the same direction as the changed proceeding direction at a higher speed or a lower speed than a speed at which the proceeding direction is changed.

16. The method according to claim 15, wherein the turning and moving comprises:
  moving the at least one seat at a higher speed than the speed at which the proceeding direction is changed until the at least one seat begins to turn and move within the preset angle range and, then, reaches an intermediate angle of the preset angle range; and
  when the at least one seat is turned and moved at an angle greater than the intermediate angle of the entire angle range, moving the at least one seat at a lower speed than the speed at which the proceeding direction is changed.

17. The method according to claim 14, further comprising turning and moving the display unit inside the vehicle in the same turning direction and at the same turning speed as the at least one seat.

* * * * *